United States Patent
Phagoo et al.

(10) Patent No.: US 6,814,868 B2
(45) Date of Patent: Nov. 9, 2004

(54) PROCESS FOR REDUCING CONCENTRATIONS OF HAIR, TRASH, OR FIBROUS MATERIALS, IN A WASTE WATER TREATMENT SYSTEM

(75) Inventors: Deonarine Phagoo, Toronto (CA); Pierre Coté, Dundas (CA); Hidayat Husain, Brampton (CA); Doug Thompson, Brampton (CA); Baoqiang Ling, Hamilton (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 09/892,860

(22) Filed: Jun. 28, 2001

(65) Prior Publication Data

US 2003/0006200 A1 Jan. 9, 2003

(51) Int. Cl.[7] .............................................. B01D 61/00
(52) U.S. Cl. ..................... 210/651; 210/650; 210/652; 210/195.2; 210/767; 210/416.1; 210/805; 210/605
(58) Field of Search ................................. 210/651, 652, 210/195.2, 650, 416.1, 805, 605, 767

(56) References Cited

U.S. PATENT DOCUMENTS

| | | | |
|---|---|---|---|
| 4,071,445 A | | 1/1978 | Katayama et al. |
| 5,578,213 A | * | 11/1996 | Miller et al. |
| 5,595,349 A | * | 1/1997 | Bersrom et al. |
| 5,637,221 A | * | 6/1997 | Coyne |
| 5,658,458 A | | 8/1997 | Keyser et al. |
| 5,824,222 A | | 10/1998 | Keyser et al. |
| 6,029,479 A | * | 2/2000 | Pattee |
| 6,361,695 B1 | * | 3/2002 | Husain et al. |
| 6,475,377 B1 | * | 11/2002 | Fox et al. |

FOREIGN PATENT DOCUMENTS

| | | |
|---|---|---|
| DE | 4443091 | 1/1996 |
| JP | 63302996 | 12/1988 |
| JP | 03042019 | 2/1991 |
| JP | 06126281 | 5/1994 |
| JP | 070602648 | 3/1995 |
| JP | 2001062488 | 3/2001 |
| WO | WO0139869 | 6/2001 |

* cited by examiner

*Primary Examiner*—Ana Fortuna
(74) *Attorney, Agent, or Firm*—Bereskin & Parr

(57) ABSTRACT

A process for reducing hair, trash or fibrous materials concentration in a waste water treatment system having a membrane filter in conjunction with a bioreactor comprises flowing a portion of mixed liquor through a screen in a side stream. The flow rate of the mixed liquor through the screen is about no more than the average design flow rate of the waste water treatment system. The screenings can be either treated or disposed of directly or in combination with the waste activated sludge. The openings of the screen are between about 0.10 mm and about 1.0 mm in size as can be provided by, for example, a rotary drum screen. The invention can be used to provide both screening and sludge thickening.

38 Claims, 5 Drawing Sheets

PROCESS FOR REDUCING CONCENTRATIONS OF HAIR, TRASH, OR FIBROUS MATERIALS, IN A WASTE WATER TREATMENT SYSTEM

FIELD OF THE INVENTION

The present invention relates to a process for reducing concentrations of hair, trash, or fibrous materials, in a waste water treatment system, particularly a membrane bioreactor.

BACKGROUND OF THE INVENTION

Minimizing hair, trash, or fibrous materials build-up on membrane filters in waste water treatment systems is desirable for efficient operation of the system. Hair, trash, or fibrous materials, can accumulate on the membrane fibre bundles of the membrane filter and are difficult to remove and can damage the membrane.

Conventional processes to reduce hair, trash, or fibrous materials build-up can include screening the raw sewage stream to the waste water system before the raw sewage enters the waste water treatment system. Another approach screens the entire sludge stream (comprised of raw sewage plus sludge recycle from the system) before it enters the waste water treatment system.

Screening the raw sewage, however, requires that the screening system be designed to accommodate the raw sewage flow under peak conditions which can typically be three or more times the average design flow rate of the system. This requires that the screens be large to accommodate the flow. Additionally, such system should be designed with duty screens and standby screens each of 100% of the design screen capacity. By screening the raw sewage before it enters the waste water treatment system, the screenings generated can be high in undigested organic materials that require special equipment to return the undigested organic materials from the screenings to the waste water treatment system. Moreover, screening raw sewage before it enters the waste water treatment system does not remove hair, trash, or fibrous materials that can form within the system itself, such as, for example, re-roped or re-balled fibrous materials.

Screening the entire sludge stream before it enters the membrane filter of the waste water treatment system must also accommodate high flow rates (typically four or more times the average design flow rate of the system) again requiring the use of large duty screens and full capacity standby screens.

SUMMARY OF THE INVENTION

The present invention relates to a process for reducing hair, trash, or fibrous material concentration in a waste water treatment system. Waste water treatment systems of this invention have a filter, such as, for example, a membrane filter or a hollow fibre membrane filter, in conjunction with a bioreactor to produce a treated effluent from the filter and waste sludge from material rejected by the filter or otherwise remaining in the bioreactor. The bioreactor can be located upstream of the filter in the waste water treatment system or alternatively the filter can be in the bioreactor or a part of the bioreactor. In the latter instances the membrane of the filter is submerged directly in the bioreactor.

The process comprises flowing water to be treated to the waste water treatment system. A portion of mixed liquor from the waste water treatment system is removed and passed through a screen to remove hair, trash, or fibrous materials from the mixed liquor. The screened mixed liquor is then flowed to the waste water treatment system. The flow rate of the mixed liquor through the screen is not more than about the average design flow rate of the waste water treatment system. The flow rate of the mixed liquor through the screen can be about 0.10 to about 1.0 of the average design flow rate of the waste water treatment system. In particular, the flow rate of the mixed liquor through the screen can be not more than about half the average design flow rate of the waste water treatment system. Moreover, the mixed liquor can pass through the screen at a substantially constant flow rate and can pass through the screen substantially continuously.

The mixed liquor to be screened can be removed from the recycle mixed liquor stream in the waste water treatment system. Typically recycled mixed liquor is recycled to the head of the waste water treatment system, and the mixed liquor to be passed through the screen can be removed from the recycle mixed liquor stream. For example, the mixed liquor to be passed through the screen can be removed from the recycle mixed liquor stream upstream of where the screened mixed liquor flows back to the recycle mixed liquor stream. Alternately, the mixed liquor to be screened can be removed from the waste water treatment system at various other locations. The screened mixed liquor can be flowed back to the wastewater treatment system directly or to the recycle mixed liquor stream and the screenings can be either treated or disposed of directly or in combination with the waste activated sludge.

The openings of the screen can be not more than about 1.0 mm. Particularly, the openings can be not more than about 0.75 mm. More particularly, the openings can be not more than about 0.50 mm. One screen suitable for use in this invention is, for example, a rotary drum screen. The invention can be used, without limitation, with waste water treatment systems with existing screens or clarifiers on raw sewage that do not meet minimum screening requirements for membrane filters, with systems meeting minimum screening requirements where the operator desires added protection for a membrane filter, with new systems where the invention can be used in place of any other screening and in new or existing plants that will use the invention to provide both screening and sludge thickening.

BRIEF DESCRIPTION OF THE DRAWINGS

Embodiments of the present invention will be described below with reference to the following figures.

DETAILED DESCRIPTION OF THE INVENTION

Figure 1:
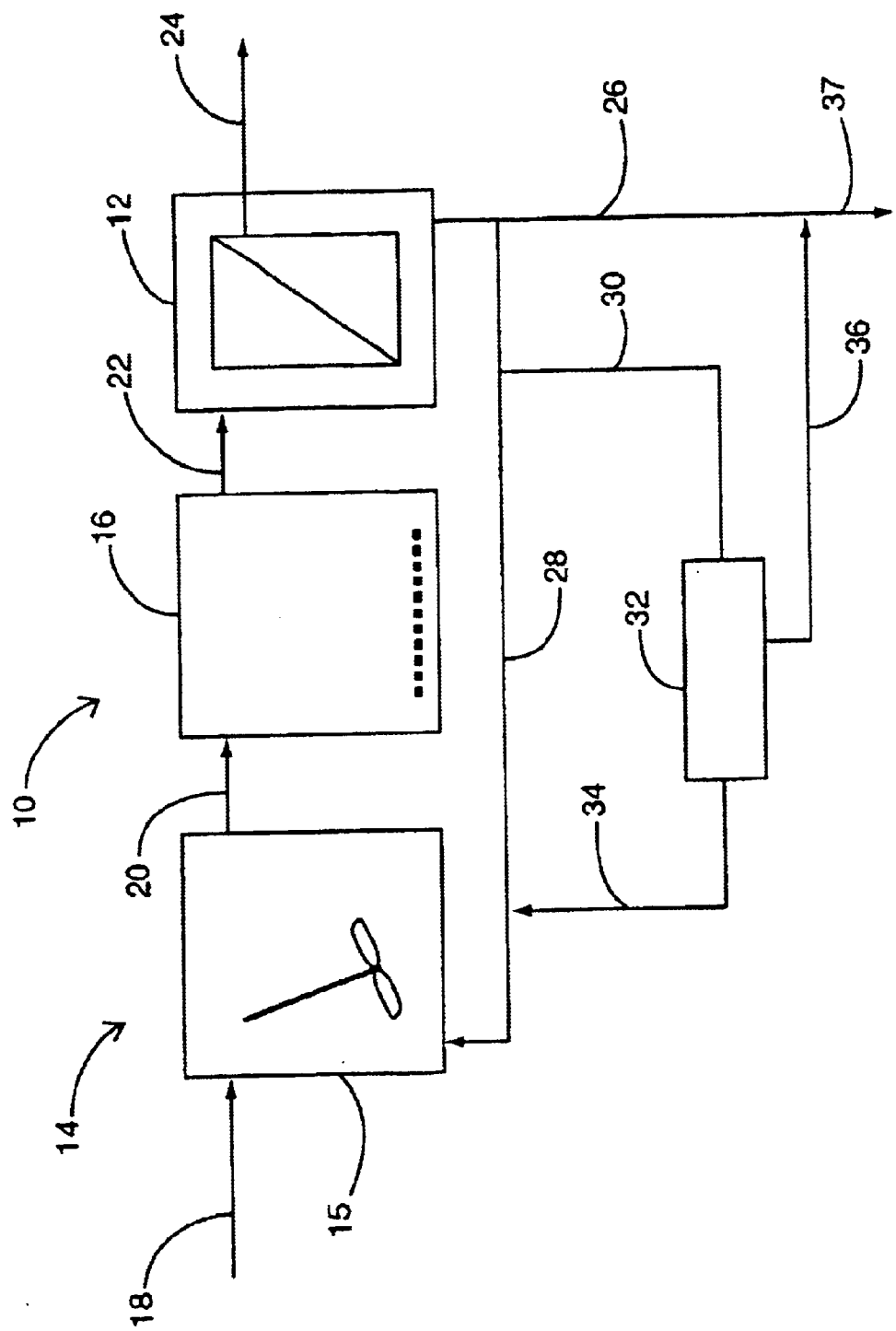
FIG. 1 is a schematic diagram illustrating a first process.

A first process of the present invention is shown in FIG. 1. A waste water treatment system 10 is illustrated comprising a filter 12, such as, for example, a membrane filter or a hollow fibre membrane filter, and a bioreactor 14, located upstream of filter 12.

Bioreactor 14 can comprise, without limitation, alone or in various combinations, one or more anaerobic zones, one or more anoxic zones, and one or more aerobic zones. For the embodiment illustrated in FIG. 1 the bioreactor has a continuously stirred anoxic tank 15 at the head of the waste water treatment system 10 followed by an aeration tank 16.

An influent 18 of water to be treated by the waste water treatment system 10 enters the anoxic tank 15. Influent 18 can optionally be screened or clarified (not illustrated) prior to entering bioreactor 14 to remove hair, trash, or fibrous materials, and other particulate material. An anoxic tank exit stream 20 carries mixed liquor from anoxic tank 15 to aeration tank 16. An aerated exit stream 22 carries an aerated mixed liquor from the aeration tank 16 to the retentate or feed side of filter 12.

A treated effluent stream 24 exits from a permeate side of filter 12 for later disposal as desired. A waste sludge stream 26, consisting of material rejected by filter 12 or otherwise produced in the bioreactor 14 also exits from the filter 12. Some of the mixed liquor from waste sludge stream 26 can be recycled to bioreactor 14 through a retentate recycle stream 28.

A side stream 30 removes a portion of the mixed liquor from recycle stream 28 and carries the removed mixed liquor through a screen 32. Screen 32 removes hair, trash, or fibrous materials, in the mixed liquor passing through it including, but not limited to, hair, trash, or fibrous materials, that can form within the bioreactor itself, such as, for example, re-roped or re-balled fibrous materials. Such re-roped or re-balled fibrous materials are made from fine fibrous materials that may not be large enough to be removed by a typical screen 32 themselves but that can aggregate into larger materials in the mixed liquor.

A screened mixed liquor stream 34 exits from screen 32 to re-enter the waste water treatment system 10 upstream of filter 12. In FIG. 1 the screened mixed liquor stream 34 carries the screened mixed liquor to retentate recycle stream 28 downstream of side stream 30. Retentate recycle stream 28 carries the screened mixed liquor to bioreactor 14 at the anoxic tank 15. The side stream can be taken from and returned to any portion of the waste water treatment system, however, since screen 32 removes hair, trash, or fibrous materials in the mixed liquor based on an average removal of these materials over a solids retention time of the entire bioreactor.

The screen openings (not illustrated) of screen 32 are typically between about 0.25 mm and 1.0 mm. Screen openings of 0.5 mm can be used when the screenings will be sent to a digester or when the screen 32 is used for sludge thickening. Screen openings of 0.75 mm can be used when the screenings will be disposed of directly, for example, to a landfill. When screening mixed liquor, the screen 32 typically blinds partly which reduces the effective screen size to increase the amount of screenings removed by the screen 32. Screen 32 can be an internally fed rotary drum screen (not illustrated) equipped with a woven wire mesh or punch hole screening media. Screen 32 can be equipped with external outside-in spray bars to keep the screen media clean, and diverter flights to continuously move solids to a discharge end of the screen 32. Screen 32 can be, however, any fine screen with a screen size opening typically between about 0.25 mm and 1.0 mm, for example, a wedge wire screen.

A screenings stream 36 exits from screen 32. Screening stream 36 is "stabilized" since it has been exposed to biodegradation. In the process shown in FIG. 1 screenings stream 36 carries hair, trash, or fibrous materials, removed from the mixed liquor by screen 32 to the waste sludge stream 26 downstream of retentate recycle stream 28. Where screen 32 is a rotary drum screen, adjusting the drum speed can produce a liquid screenings stream having biodegradable solids suitable for mixing with a waste sludge stream 26 to produce a single sludge stream 37.

Figure 2:
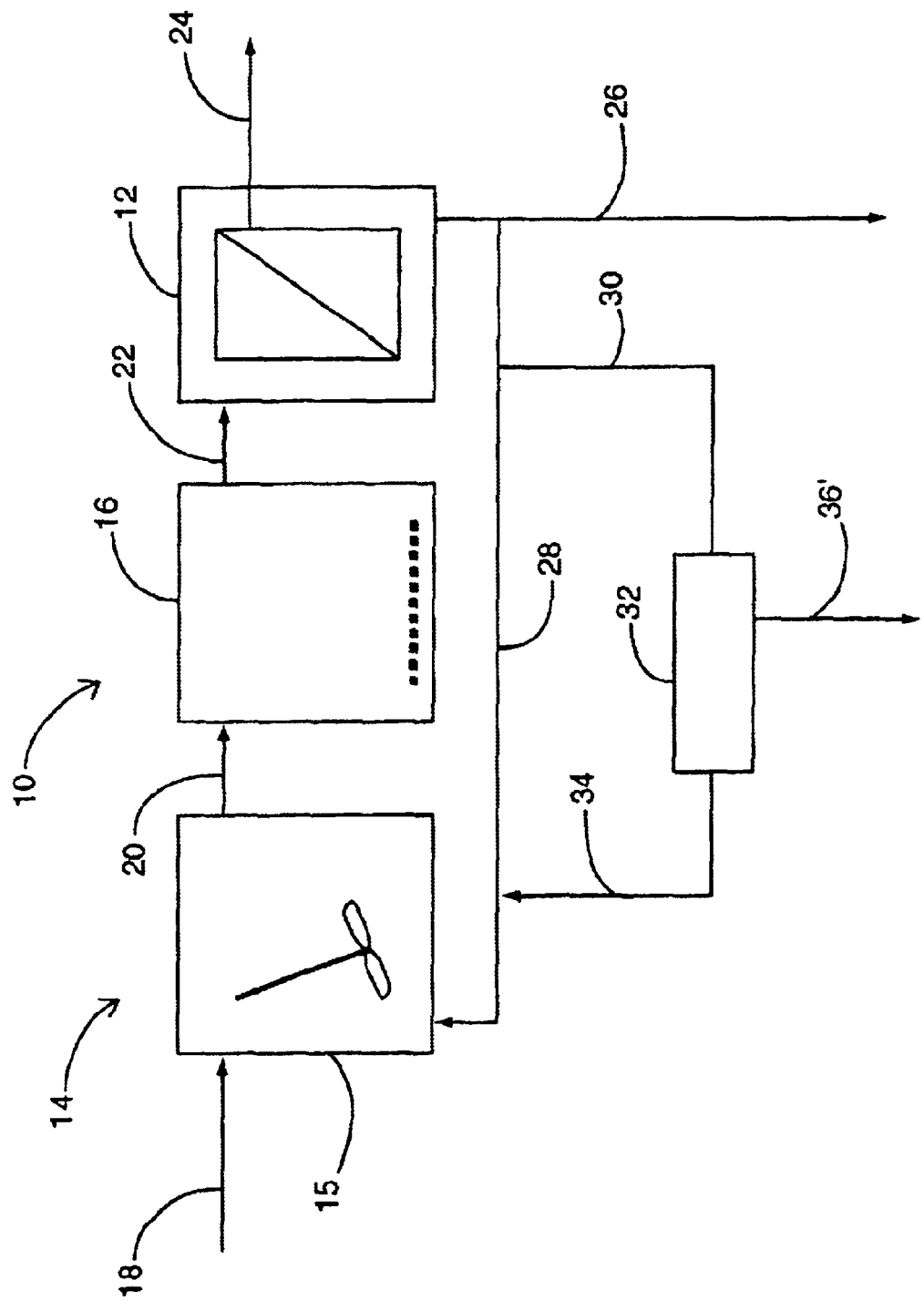
FIG. 2 is a schematic diagram illustrating a second process.

FIG. 2 shows a second process (similar to the process shown in FIG. 1) where the screenings stream may be further treated or disposed of directly without being returned to the waste sludge stream. Except where noted and described below the same reference characters will be used to identify the same parts in both figures. In the process shown in FIG. 2 screening stream 36' can be compacted and dewatered and disposed without further treatment, for example, to a landfill. If the screenings stream 36' is to be disposed of without further treatment, screen 32 can be fitted with a dual sprayer system to wash the screening and reduce the amount of biomass that can be trapped or otherwise collected in the screenings before the screenings are discharged from the screen 32. The amount of biomass discharged in the screenings can be less than about 15% of the dried weight of the screenings and less than about 2% of the total waste activated sludge and so will have minimal impact on biological processes in the system 10. If the screenings will be disposed of directly, the screenings stream 36' can be equipped with compacting and dewatering means, such as a screw compactor, to provide screenings with over 40% dried solids (i.e., that passes a "paint filter test"). A bagging system may be used to reduce or eliminate human contact and odours.

Figure 3:
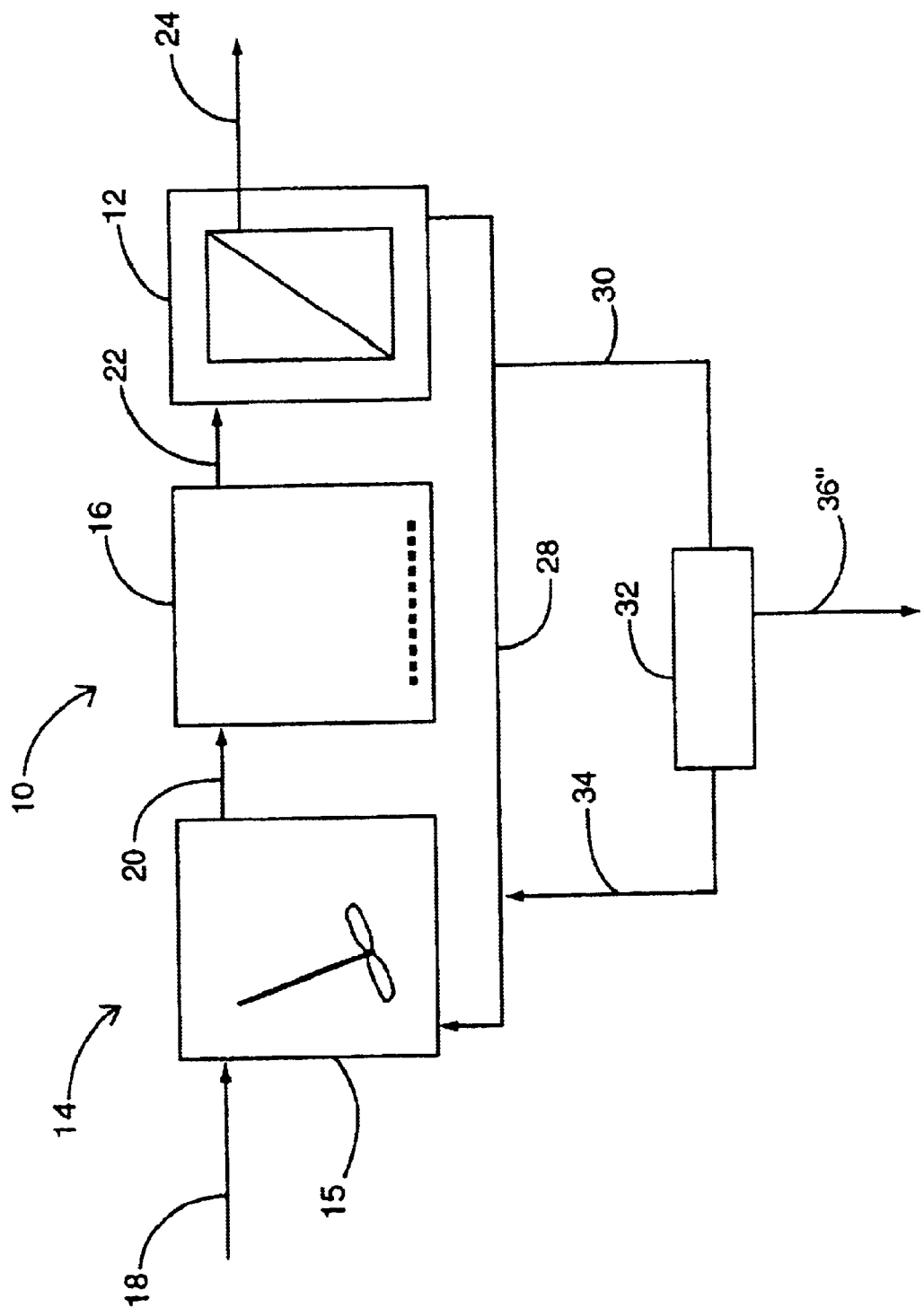
FIG. 3 is a schematic diagram illustrating a third process.

FIG. 3 shows a third process (similar to the processes shown in FIGS. 1 and 2) where the screen 32 can be used to thicken sludge so that screenings stream can, if desired, serve as the waste stream and remove biomass from the system. Except where noted and described below the same reference characters will be used to identify the same parts in FIG. 3 as in FIGS. 1 and 2. The screenings stream 36" may be a thickened sludge and may contain high solids content, for example, 10–12% dried weight for the wet screenings. Screen 32 can remove additional biomass by adding to the side stream 30 upstream of the screen 32, at scheduled times, a polymer that increases the biodegradable solids content of the screenings. By using screen 32 to remove a thick sludge, screenings stream 36" is able to remove sufficient biomass from the system and serve as the waste stream for the system. Accordingly, the process in FIG. 3 can replace the waste sludge stream 26 of FIGS. 1 and 2 with the retentate recycle stream 28.

A typical process as shown in FIG. 3 generates about 0.04 kg. dried screenings per $m^3$ of sewage feed in the waste water treatment system with a 0.5 mm screen and a single sprayer. In contrast a 0.75 mm screen with a dual sprayer system used in the process shown in FIG. 2 produces about 40% less dried screenings.

In all of the embodiments described above, the mixed liquor may be passed through the screen 32 at a substantially constant flow rate without increasing substantially during peak flow conditions of the waste water treatment system. The flow rate of the mixed liquor through the screen 32 can be about no more than the average design flow rate of the waste water treatment system. In particular, the flow rate of the mixed liquor through the screen can be no more than about half the average design flow rate of the waste water treatment system. More particularly, the flow rate of the mixed liquor through the screen can be about 0.10 to about 0.50 of the average design flow rate of the waste water treatment system. The relatively low flow rate through the screen 32 (compared to systems which screen the influent 18 directly) keeps the size of the screen 32 small while the substantially constant flow rate allows the screen 32 to be used efficiently.

Moreover, the flow rate through the screen can be substantially continuous, however, since screen 32 removes hair, trash, or fibrous materials, in the mixed liquor based on an average removal of these materials over a solids retention time of the entire bioreactor, an interruption in flow can be tolerated without significantly impacting performance. For example, flow can be interrupted to allow for screen 32 to be replaced or repaired or to allow for other elements in the system to be checked and maintained.

Since screen 32 does not need to operate at full capacity at the time of peak influent flow 18, then, for example, one duty screen at 100% capacity, or two duty screens 32, each designed for 50% of the required capacity, may be used without standby screens.

The retentate recycle stream 28 for a water waste treatment system as illustrated in FIG. 1 is typically 4–5 times the flow of influent 18 (Q). The flow of influent, Q, is generally equal to the average design flow of the waste water treatment system. Without using screen 32 the hair, trash, or fibrous materials, concentration in bioreactor 14 ($X_b$) will build-up to a level equal to the hair, trash, or fibrous materials, concentration of the influent 18 ($X_f$) times the ratio of the solids retention time (SRT) to the hydraulic retention time (HRT). At steady state, the mass of hair, trash, or fibrous materials, ($Q \times X_f$) in the influent is equal to the mass of hair, trash, or fibrous materials, in the waste sludge stream 26 ($Q_w \times X_b$), thus:

$$Q \times X_f = Q_w \times X_b \quad (1)$$

Q is equal to the volume (V) of the entire bioreactor 14 divided by HRT of the entire bioreactor. $Q_w$ is equal to the volume (V) of the entire bioreactor divided by SRT of the entire bioreactor. Therefore:

$$\frac{V}{HRT} \times X_f = \frac{V}{SRT} \times X_b \quad (2)$$

The concentration of hair, trash, or fibrous materials, in the bioreactor 14 ($X_b$) is:

$$X_b = \frac{SRT}{HRT} \times X_f \quad (3)$$

For a typical process with a 6 hour HRT and a 15 day SRT, the hair, trash, or fibrous materials, concentration in the bioreactor 14 ($X_b$) will be sixty times the hair, trash, or fibrous materials, concentration in the influent 18 ($X_f$).

With screen 32 operating at a flow rate of yQ and assuming that all the hair, trash, or fibrous materials, is removed from the stream since the screen size opening is very small (for example, 0.5–1.0 mm), the steady state relationship between feed and bioreactor hair, trash, or fibrous materials, concentrations is:

$$Q \times X_f = Q_w \times X_b + yQ \times X_b \quad (4)$$

Therefore:

$$X_b = \frac{SRT}{ySRT + HRT} \times X_f \quad (5)$$

For the same process conditions (6 hour HRT and 15 day SRT) and with screen 32 operating at a flow rate of 0.25Q (y=0.25), the hair, trash, or fibrous materials, concentration in the bioreactor 14 will be 3.75 times the hair, trash, or fibrous materials, concentration in the influent. Using a screen under these conditions should reduce the hair, trash, or fibrous materials, content in the mixed liquor by approximately 94% compared to not using a screen 32.

By using a screen 32 a substantial amount of hair, trash, or fibrous materials, is removed from the mixed liquor without having to screen the entire recycled sludge stream or the entire peak flow coming into the plant. A typical plant operating at a 6 hour HRT, operating screen 32 at a flow rate of 0.25Q will process the equivalent of the total sludge volume once per day. In typical plants, the entire sludge volume will be screened 10–20 times over a typical solids retention time which allows many opportunities for the screen 32 to capture re-roped or re-balled fibrous materials in the mixed liquor.

Figure 4:
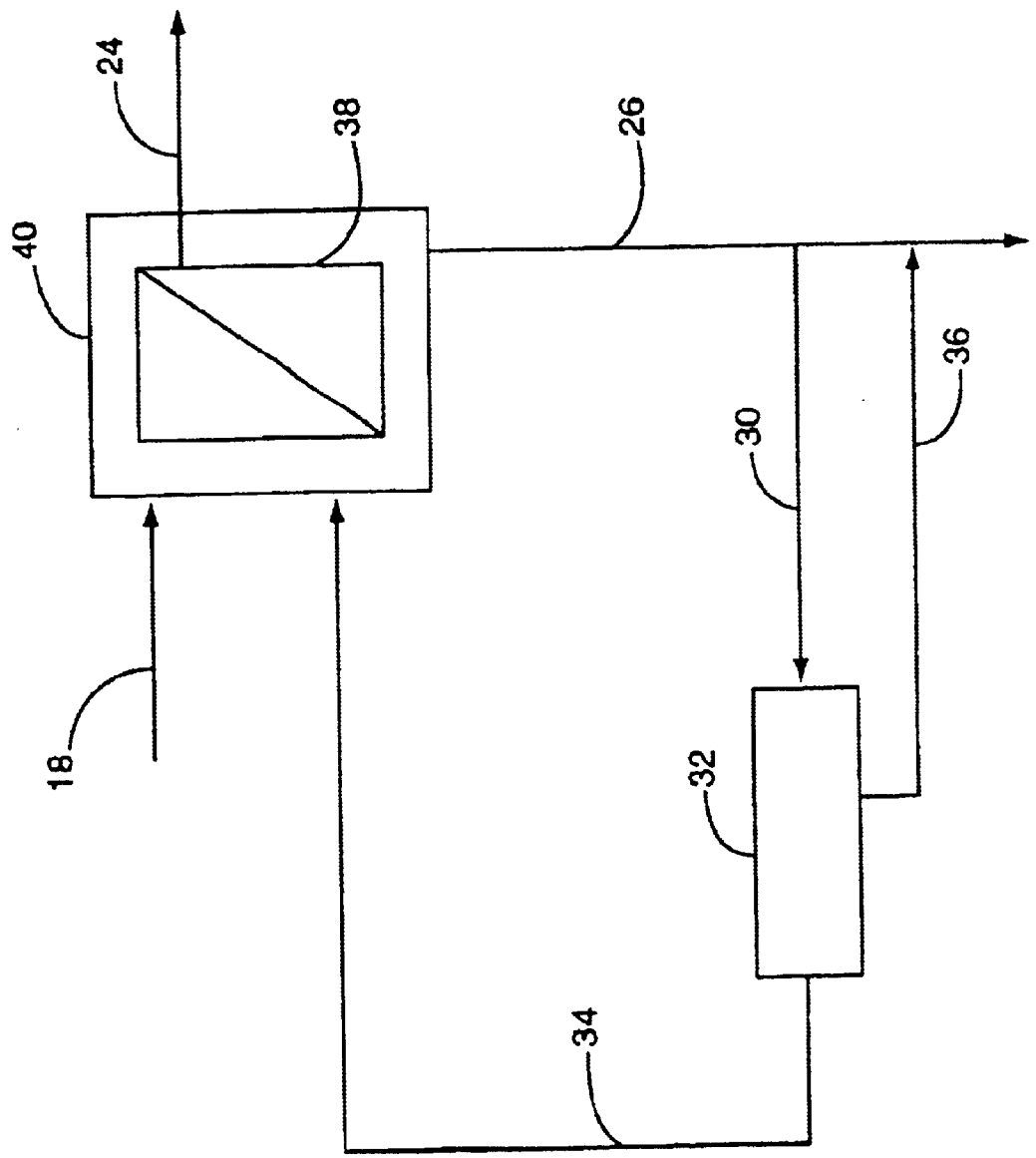
FIG. 4 is a schematic diagram illustrating a fourth process.

The screen 32 can be placed in a wide variety of locations. For example, FIG. 4 shows a fourth process. The fourth process is similar to the first process but with modifications as discussed below. The filter 38 is located in a single tank bioreactor 40 with the membrane of filter 38 submerged directly in the single tank bioreactor 40.

In FIG. 4 side stream 30 removes a portion of the mixed liquor from waste sludge stream 26 and carries the removed mixed liquor through screen 32. Screen 32 removes hair, trash, or fibrous materials, from the mixed liquor passing through the side screen. The screened mixed liquor stream 34 exits from screen 32 to re-enter single tank bioreactor 40. Alternately, side stream 30 can be taken directly from the single tank bioreactor 40 at a location distinct from the waste sludge stream 26. Flow rates through the side stream 30 are as described for FIG. 1.

Figure 5:
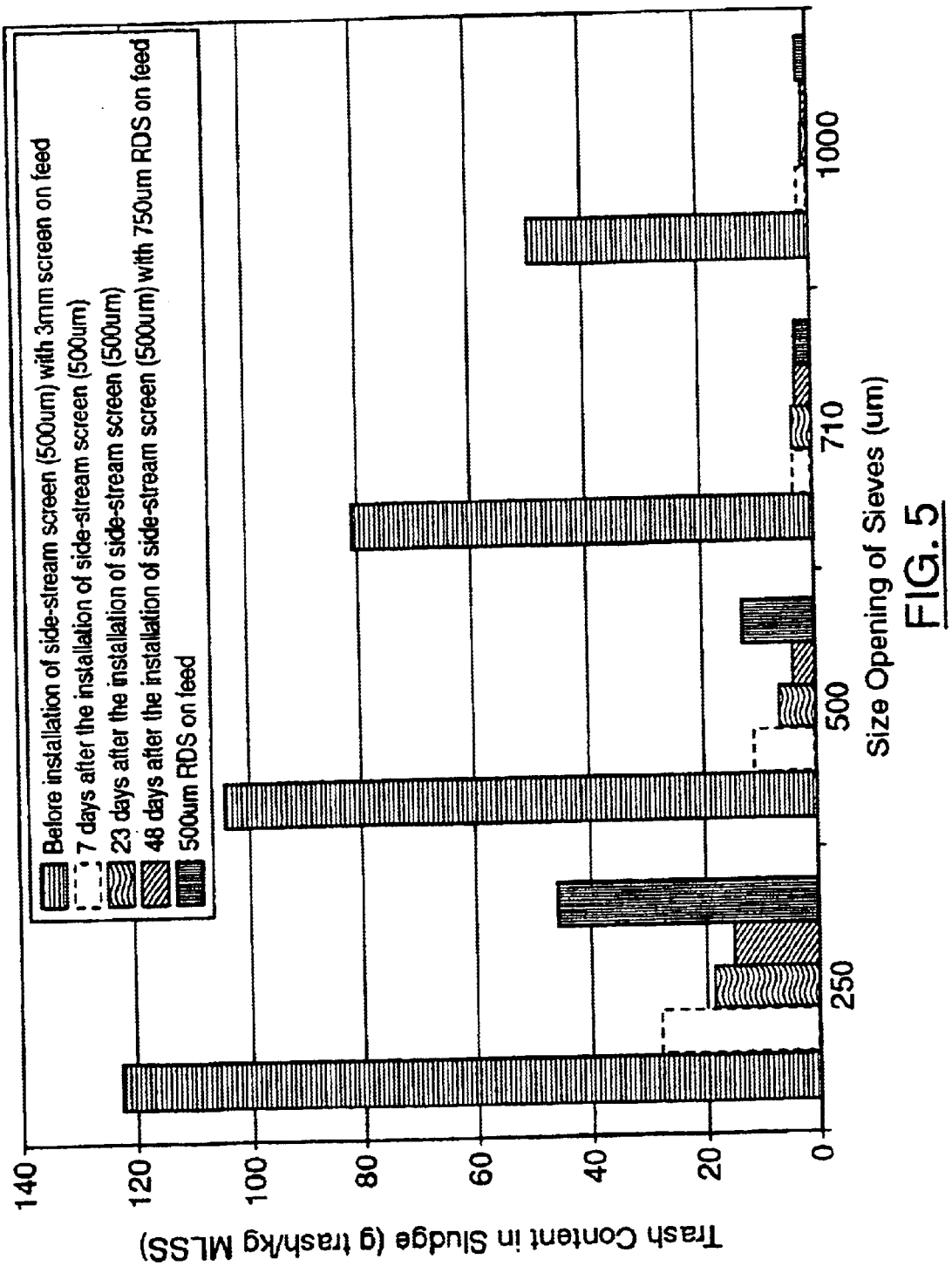
FIG. 5 is a graph of experimental results.

As an example, a pilot plant was set up (as in FIG. 4) using two ZW500c-3 filtration cassettes having a filter pore size of 0.04 µm, surface area of 1320 m³, and a flux of 25–40 L/m²/h. The pilot plant was operated at a SRT of 10 days, an HRT of 3.3 hours and an MLSS of 15 g/L. The screened side stream flow rate was about 1Q. The plant was run under a variety of conditions as shown in FIG. 5. During the side stream screening tests, a 3.0 mm screen remained on the feed. All screens used were rotary drum screens.

The trash (including hair or fibrous materials) concentrations in the mixed liquor for the various tests are shown in FIG. 5. For example, a 0.5 mm side stream screen reduced the trash concentration from about 105 g/kg MLSS to about 7 g/kg MLSS after 23 days. This is less than the trash concentration in the mixed liquor produced by a 0.5 mm screen on the feed which was about 12 g/kg MLSS. The inventors believe that this improvement is the result of the side stream screen removing re-balled or re-roped fibers.

At steady state and a 3.0 mm screen on the feed, the 0.5 mm side stream screen removed about 45 g of trash from the mixed liquor per cubic meter of feed. Dried solids content was about 10–13% for the drained screenings. The biomass fraction of the screenings varied from about 7% to 30% depending on the mixed liquor flow rate, mixed liquor concentration and rotating speed of the screen. About 0.04 kg. dried screenings per m³ of sewage feed in the waste water treatment system were generated. The screenings removed consisted primarily of paper fibres, trash, sludge, hair and other stringy materials.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

What is claimed is:

1. A process for reducing hair, trash, or fibrous material concentration in a waste water treatment system, the process comprising:

a) flowing water to be treated to the waste water treatment system, the waste water treatment system having a membrane filter;

b) treating the water in the waste water treatment system and producing a mixed liquor, and a treated effluent by said membrane;

c) removing a portion of mixed liquor from the waste water treatment system and passing the mixed liquor through a screen to remove hair, trash, or fibrous materials from the mixed liquor so that the average flow rate of the mixed liquor passing through the screen is not more than about 1.0 of the average design flow rate of the waste water treatment system; and d) recycling the screened mixed liquor to the waste water treatment system.

2. The process of claim 1 wherein the membrane filter is a hollow fibre membrane filter.

3. The process of claim 1 wherein a second portion of said mixed liquor is recycled to an upstream part of the waste water treatment system.

4. The process of claim 3 wherein the screened mixed liquor is mixed with the recycle mixed liquor stream.

5. The process of claim 4 wherein the mixed liquor portion to be passed through the screen is removed from the recycle mixed liquor stream.

6. The process of claim 1 wherein the waste water treatment system produces a waste sludge that is removed from the membrane through a waste sludge system.

7. The process of claim 6 wherein screenings produced from screening the mixed liquor are flowed to the waste sludge stream.

8. The process of claim 6 wherein screenings produced from screening the mixed liquor are disposed of without further biological treatment.

9. The process of claim 1 wherein a polymer is added to the mixed liquor before passing the mixed liquor through the screen to produce screenings that are a thickened sludge.

10. The process of claim 1 wherein the average flow rate of the mixed liquor through the screen is about 0.10 to about 1.0 of the average design flow rate of the waste water treatment system.

11. The process of claim 10 wherein the average flow rate of the mixed liquor through the screen is not more than about half the average design flow rate of the waste water treatment system.

12. The process of claim 1 wherein the screen size opening is not more than about 1.0 mm.

13. The process of claim 12 wherein the screen size opening is about 0.25 mm to about 0.75 mm.

14. The process of claim 13 wherein the screen size opening is not more than about 0.50 mm.

15. The process of any one of claim 12 to 14 wherein the screen is a rotary drum screen.

16. The process of claim 15 wherein the screen has a dual sprayer system.

17. The process of claim 1 wherein the mixed liquor is passed through the screen at a substantially constant flow rate.

18. The process of claim 1 wherein the mixed liquor is substantially continuously passed through the screen.

19. The process of claim 1 wherein the mixed liquor is substantially continuously passed through the screen and is passed through the screen at a substantially constant flow rate.

20. A process for reducing hair, trash, or fibrous material concentration in a waste water treatment system, the process comprising:

a) flowing water to be treated to the waste water treatment system, the waste water treatment system having a membrane filter;

b) treating the water in the waste water treatment system and producing a mixed liquor, and treated effluent by said membrane;

c) removing a portion of the mixed liquor from the waste water treatment system downstream of the membrane filter and passing the mixed liquor through a screen to remove hair, trash, or fibrous materials from the mixed liquor so that the average flow rate of the mixed liquor passing through the screen is not more than about 1.0 of the average design flow rate of the waste water treatment system; and d) recycling the screened mixed liquor to the waste water treatment system upstream of the membrane filter.

21. The process of claim 20 wherein the membrane filter is a hollow fibre membrane filter.

22. The process of claim 20 wherein the waste water treatment system further includes a recycle mixed liquor stream that is withdrawn from the waste water treatment system downstream of the membrane filter and recycled to an upstream part of the waste water treatment system.

23. The process of claim 22 wherein the screened mixed liquor is mixed with to the recycle mixed liquor stream.

24. The process of claim 23 wherein the mixed liquor portion to be passed to the screen is removed from the recycled mixed liquor stream.

25. The process of claim 20 wherein the waste water treatment system produces a waste water sludge that is removed from the membrane through a waste sludge stream.

26. The process of claim 25 wherein screenings produced from screening the mixed liquor are flowed to the waste sludge stream.

27. The process of claim 25 wherein screenings produced from screening the mixed liquor are disposed of without further biological treatment.

28. The process of claim 20 wherein a polymer is added to the mixed liquor before passing the mixed liquor through the screen to produce screenings that are a thickened sludge.

29. The process of claim 20 wherein the average flow rate of the mixed liquor through the screen is about 0.10 to about 1.0 of the average design flow rate of the waste water treatment system.

30. The process of claim 29 wherein the average flow rate of the mixed liquor through the screen is not more than about half the average design flow rate of the waste water treatment system.

31. The process of claim 20 wherein the screen size opening is not more than about 1.0 mm.

32. The process of claim 31 wherein the screen size opening is about 0.25 mm to about 0.75 mm.

33. The process of claim 32 wherein the screen size opening is not more than about 0.50 mm.

34. The process of any one of claim 31 to 33 wherein the screen is a rotary drum screen.

35. The process of claim 34 wherein the screen has a dual sprayer system.

36. The process of claim 20 wherein the mixed liquor is passed through the screen at a substantially constant flow rate.

37. The process of claim 20 wherein the mixed liquor is substantially continuously passed through the screen.

38. The process of claim 20 wherein the mixed liquor is substantially continuously passed through the screen and is passed through the screen at a substantially constant flow rate.

* * * * *

UNITED STATES PATENT AND TRADEMARK OFFICE
CERTIFICATE OF CORRECTION

PATENT NO. : 6,814,868 B2
DATED : November 9, 2004
INVENTOR(S) : Deonarine Phagoo It is certified that error appears in the above-identified patent and that said Letters Patent is hereby corrected as shown below:

Column 7,
Line 21, delete "recycle" and insert -- recycled --.
Line 26, after the word "waste" insert -- water --.
Line 27, delete "system" and insert -- stream --.

Signed and Sealed this

Tenth Day of May, 2005

JON W. DUDAS
*Director of the United States Patent and Trademark Office*